(12) United States Patent
Nishimura (10) Patent No.: US 9,619,501 B2
(45) Date of Patent: Apr. 11, 2017

(54) INDEX SCAN DEVICE AND INDEX SCAN METHOD

(71) Applicant: NEC CORPORATION, Tokyo (JP)

(72) Inventor: Shoji Nishimura, Tokyo (JP)

(73) Assignee: NEC Corporation, Tokyo (JP)

( * ) Notice: Subject to any disclaimer, the term of this patent is extended or adjusted under 35 U.S.C. 154(b) by 312 days.

(21) Appl. No.: 14/371,853

(22) PCT Filed: Jan. 10, 2013

(86) PCT No.: PCT/JP2013/000067
§ 371 (c)(1),
(2) Date: Jul. 11, 2014

(87) PCT Pub. No.: WO2013/105505
PCT Pub. Date: Jul. 18, 2013

(65) Prior Publication Data
US 2015/0012544 A1 Jan. 8, 2015

(30) Foreign Application Priority Data

Jan. 13, 2012 (JP) ................................. 2012-005562

(51) Int. Cl.
*G06F 17/30* (2006.01)
(52) U.S. Cl.
CPC .... *G06F 17/30333* (2013.01); *G06F 17/3087* (2013.01); *G06F 17/30327* (2013.01)
(58) Field of Classification Search
CPC ......... G06F 17/30333; G06F 17/30327; G06F 17/3087
See application file for complete search history.

(56) References Cited

U.S. PATENT DOCUMENTS 6,510,435 B2 * 1/2003 Bayer ............... G06F 17/30327
6,578,031 B1 * 6/2003 Washizawa ......... G06F 17/3069
(Continued)

FOREIGN PATENT DOCUMENTS

JP 2001-209651 A 8/2001

OTHER PUBLICATIONS

Extended European Search Report issued by the European Patent Office for Application No. 13736030.1 dated Jan. 7, 2016 (9 pages).
(Continued)

*Primary Examiner* — James Trujillo
*Assistant Examiner* — Hubert Cheung
(74) *Attorney, Agent, or Firm* — Wilmer Cutler Pickering Hale and Dorr LLP (57) ABSTRACT

The index scan device acquires information on a search space in a multi-dimensional space corresponding to a search range of a query; sets, as a search point, a data point corresponding to at least one of a minimum and a maximum of values obtained by changing each data point in the multi-dimensional space to be one-dimensional, from among data points contained in the search space or the partial search space; identifies index data associated with a partial space containing the search point; estimates a boundary line passing through the search space on the basis of identification information on the partial space obtained from the identified index data; and determines, from among divided search spaces obtained by dividing the search space by the estimated boundary line.

9 Claims, 7 Drawing Sheets

(56) References Cited

U.S. PATENT DOCUMENTS

| | | | | |
|---|---|---|---|---|
| 7,184,998 B2* | 2/2007 | Nica | ................ | G06F 17/30466 |
| 7,437,372 B2* | 10/2008 | Chen | ................ | G06F 17/30333 |
| 7,769,733 B2* | 8/2010 | Chen | ................ | G06F 17/30333 707/600 |
| 7,983,482 B2* | 7/2011 | Kamata | ................ | G06K 9/4604 382/168 |
| 2003/0004938 A1* | 1/2003 | Lawder | ............ | G06F 17/30333 |
| 2006/0106833 A1* | 5/2006 | Chen | ................ | G06F 17/30333 |
| 2010/0185588 A1* | 7/2010 | Grigorian | ......... | G06F 17/30333 707/661 |
| 2010/0281013 A1* | 11/2010 | Graefe | ............ | G06F 17/30327 707/715 |

OTHER PUBLICATIONS

Tropf, H. and Herzog, H., "Multidimensional Range Search in Dynamically Balanced Trees," Angewandte Informatik (Applied Informatics), pp. 71-77 (Feb. 1981).

International Search Report corresponding to PCT/JP2013/000067 dated Feb. 12, 2013 (5 pages).

Shoji Nishimura et al., "MD-HBase: A Scalable Multi-dimensional Data Infrastructure for Location Aware Services," Mobile Data Management (MDM), 2011 12th IEEE International Conference online, vol. 1, Jun. 9, 2011, pp. 7-16.

Nobuhiko Kamikawa et al., "High-dimensional Indexing Methods for Similarity—search of Image Contents," Transactions of Information Processing Society of Japan, Jan. 15, 2001, vol. 42, No. SIG1 (TOD8), pp. 140-147.

Shinji Nakadai, et al., "PLATON: Multi-dimensional Range Query System for Data Sharing in Distributed System," Symposium on Multimedia , Distributed, Cooperative and Mobile Systems (DICOMO2007) Ronbunshu (CD-ROM), Jun. 29, 2007, vol. 2007, No. 1, pp. 173-184.

Shoji Nishimura, "Tajigen Han'i Kensaku o Kano to Suru Key-Value Store MD-HBase," NEC Technical Journal (online), Sep. 2012, vol. 65, No. 2, pp. 69-72, [URL: http://www.nec.co.jp/techrep/ja/journal/g12/n02/120216.pdf].

Shoji Nishimura, "Key-Value Store MD-HBase," Enables Multi-Dimensional Range Queries, NEC Technical Journal (online), Sep. 2012, vol. 7, No. 2, pp. 76-80, [URL: http://www.nec.com/en/global/techrep/journal/g12/n02/pdf/120216.pdf].

* cited by examiner

|     | 000 | 001 | 010 | 011 | 100 | 101 | 110 | 111 |
|-----|-----|-----|-----|-----|-----|-----|-----|-----|
| 111 | 010 101 | 010 111 | 011 101 | 011 111 | 110 101 | 110 111 | 111 101 | 111 111 |
| 110 | 010 100 | 010 110 | 011 100 | 011 110 | 110 100 | 110 110 | 111 100 | 111 110 |
| 101 | 010 001 | 010 011 | 011 001 | 011 011 | 110 001 | 110 011 | 111 001 | 111 011 |
| 100 | 010 000 | 010 010 | 011 000 | 011 010 | 110 000 | 110 010 | 111 000 | 111 010 |
| 011 | 000 101 | 000 111 | 001 101 | 001 111 | 100 101 | 100 111 | 101 101 | 101 111 |
| 010 | 000 100 | 000 110 | 001 100 | 001 110 | 100 100 | 100 110 | 101 100 | 101 110 |
| 001 | 000 001 | 000 011 | 001 001 | 001 011 | 100 001 | 100 011 | 101 001 | 101 011 |
| 000 | 000 000 | 000 010 | 001 000 | 001 010 | 100 000 | 100 010 | 101 000 | 101 010 |

FIG. 5

| INDEX DATA | PAGE ADDRESS |
|---|---|
| 0000** | 0x0001 |
| 0001** | 0x005b |
| 001*** | 0x008e |
| 010000 | 0x0103 |
| 010001 | 0x0114 |
| 010010 | 0x012a |
| ⋮ | ⋮ |
| 011100 | 0x0??? |
| 011101 | 0x0??? |
| 011110 | 0x0??? |
| 011111 | 0x0??? |
| 10**** | 0x06a8 |
| 11**** | 0x0??? |

FIG. 6

| | 000 | 001 | 010 | 011 | 100 | 101 | 110 | 111 |
|---|---|---|---|---|---|---|---|---|
| 111 | 010 101 | 010 111 | 011 101 | 011 111 | 110 101 | 110 111 | 111 101 | 111 111 |
| 110 | 010 100 | 010 110 | 011 100 | 011 110 | 110 100 | 110 110 | 111 100 | 111 110 |
| 101 | 010 001 | 010 011 | 011 001 | 011 011 | 110 001 | 110 011 | 111 001 | 111 011 |
| 100 | 010 000 | 010 010 | 011 000 | 011 010 | 110 000 | 110 010 | 111 000 | 111 010 |
| 011 | 000 101 | 000 111 | 001 101 | 001 111 | 100 101 | 100 111 | 101 101 | 101 111 |
| 010 | 000 100 | 000 110 | 001 100 | 001 110 | 100 100 | 100 110 | 101 100 | 101 110 |
| 001 | 000 001 | 000 011 | 001 001 | 001 011 | 100 001 | 100 011 | 101 001 | 101 011 |
| 000 | 000 000 | 000 010 | 001 000 | 001 010 | 100 000 | 100 010 | 101 000 | 101 010 |

FIG. 7

|     | 000 | 001 | 010 | 011 | 100 | 101 | 110 | 111 |
|-----|-----|-----|-----|-----|-----|-----|-----|-----|
| 111 | 010 101 | 010 111 | 011 101 | 011 111 | 110 101 | 110 111 | 111 101 | 111 111 |
| 110 | 010 100 | 010 110 | 011 100 | 011 110 | 110 100 | 110 110 | 111 100 | 111 110 |
| 101 | 010 001 | 010 011 | 011 001 | 011 011 | 110 001 | 110 011 | 111 001 | 111 011 |
| 100 | 010 000 | 010 010 | 011 000 | 011 010 | 110 000 | 110 010 | 111 000 | 111 010 |
| 011 | 000 101 | 000 111 | 001 101 | 001 111 | 100 101 | 100 111 | 101 101 | 101 111 |
| 010 | 000 100 | 000 110 | 001 100 | 001 110 | 100 100 | 100 110 | 101 100 | 101 110 |
| 001 | 000 001 | 000 011 | 001 001 | 001 011 | 100 001 | 100 011 | 101 001 | 101 011 |
| 000 | 000 000 | 000 010 | 001 000 | 001 010 | 100 000 | 100 010 | 101 000 | 101 010 |

INDEX SCAN DEVICE AND INDEX SCAN METHOD

CROSS-REFERENCE TO RELATED APPLICATIONS

This application is a national stage application of International Application No. PCT/JP2013/000067 entitled "Index Scan Device and Index Scan Method," filed on Jan. 10, 2013, which claims the benefit of the priority of Japanese Patent Application No. 2012-005562, filed on Jan. 13, 2012, the disclosures of each of which are hereby incorporated by reference in their entirety.

TECHNICAL FIELD

The present invention relates to an index scan technique used in multi-dimensional range search applied to a database mapped in a multi-dimensional space divided into plural partial spaces.

BACKGROUND ART

As the number of data increases, scalable distributed databases have been proposed. Most of these distributed databases realize the scalability by supporting only simple query processes such as range search only in one dimension. Further, a distributed database is proposed in which range search in plural dimensions is made possible by mapping multi-dimensional values into one-dimensional values (Non-Patent Document 1 described below).

The method of the multi-dimensional range search, proposed in Non-Patent Document 1 described below, first acquires a data point indicating the maximum value (hereinafter, referred to as a maximum data point) and a data point indicating the minimum value (hereinafter, referred to as a minimum data point) from among data points obtained by changing the search target range (search space) in a multi-dimensional space having databases mapped therein, into one-dimensional range. Then, this method scans an index string in which index data for identifying respective partial spaces in the multi-dimensional space are sorted according to the order of values indicated by the data points, in a range from the minimum data point to the maximum data point. At this time, for each of the partial spaces identified on the basis of the indices within the scanning range, this method checks whether the partial space overlaps with at least part of the search space, and determines a data page associated with the overlapping partial space to be the search target.

RELATED DOCUMENT

Non-Patent Document

Non-Patent Document 1: Shoji Nishimura, Sudipto Das, Divyakant Agrawal, Amr El Abbadi, "MD-HBase: A Scalable Multi-Dimensional Data Infrastructure for Location Aware Services", IEEE computer society, 2011.6.6.

SUMMARY OF THE INVENTION

However, with the method described above, there is a possibility that the index scan becomes inefficient. This means that, although the search space is smaller than the entire multi-dimensional space, a large number of partial spaces may be included in the index scan range (between the minimum data point and the maximum data point). A worst case scenario is that all the partial spaces identified on the basis of the indices are included in the scanning range. In such a case, all the partial spaces are required to be checked to see if these partial spaces overlap with the search space, and hence, a long period of time is required to extract partial spaces that overlap with the search space in the index scan.

This kind of problem arises from distortion occurring when the multi-dimensional space is changed to be one-dimensional. For example, in the case where the entire range of a certain attribute, rather than attribute values of part of plural attributes, is set as the search range, all the indices may be scanned although the range of attributes set is sufficiently narrow. This type of problem becomes prominent, for example, in the case where the number of dimensions that a target to be searched is large or in the case where there is a difference between the widths of the dimension ranges each set for searching.

The present invention has been made in view of the problems as described above, and provides a technique that increases the speed of index scan in the multi-dimensional range search.

In order to solve the problems described above, each aspect of the present invention employs the following configurations.

An index scan device according to the first aspect includes: an index storage unit that stores each index data for identifying each of plural partial spaces, into which a multi-dimensional space mapped in a database is divided, in a manner such that each index data is associated with each page-identifying data for identifying a data page storing data belonging to each of the plural partial spaces; a search-space acquiring unit that acquires information on a search space in the multi-dimensional space corresponding to a search range of a query, or information on a partial search space in this search space; a search-point setting unit that sets, as a search point, a data point corresponding to at least one of a minimum and a maximum of values obtained by changing each data point in the multi-dimensional space to be one-dimensional, from among data points contained in the search space or the partial search space; an index searching unit that identifies, in the index storage unit, index data associated with a partial space containing the search point set by the search-point setting unit, and extracts page-identifying data associated with the identified index data, as page-identifying data corresponding to a partial space overlapping with at least part of the search space; and a search-area determining unit that estimates a boundary line passing through the search space or the partial search space and dividing the multi-dimensional space into the plural partial spaces, on the basis of identification information on the partial space obtained from the index data identified by the index searching unit, and determines, from among divided search spaces obtained by dividing the search space or the partial search space by the estimated boundary line, a divided search space excluding the partial space containing the search point as the partial search space.

An index scan method according to the second aspect scans an index storage unit that stores each index data for identifying each of plural partial spaces, into which a multi-dimensional space mapped in a database is divided, in a manner such that each index data is associated with each page-identifying data for identifying a data page storing data belonging to each of the plural partial spaces. The index scan method according to the second aspect includes: acquiring information on a search space in the multi-dimensional space corresponding to a search range of a query, or information on a partial search space in this search space; setting, as a search point, a data point corresponding to at least one of a minimum and a maximum of values obtained by changing each data point in the multi-dimensional space to be one-dimensional, from among data points contained in the search space or the partial search space; identifying, in the index storage unit, index data associated with a partial space containing the search point; extracting page-identifying data associated with the identified index data, as page-identifying data corresponding to a partial space overlapping with at least part of the search space; estimating a boundary line passing through the search space or the partial search space and dividing the multi-dimensional space into the plural partial spaces, on the basis of identification information on the partial space obtained from the identified index data; and determining that, from among divided search spaces obtained by dividing the search space or the partial search space by the estimated boundary line, a divided search space excluding the partial space containing the search point as the partial search space.

It should be noted that another aspect of the present invention may include a program that causes a computer to realize the configuration of the first aspect, and/or a computer-readable storage medium that stores such a program. This storage medium includes a non-transitory tangible medium.

According to each of the aspects of the present invention, it is possible to provide a technique that increases the speed of index scan in the multi-dimensional range search.

BRIEF DESCRIPTION OF THE DRAWINGS

The above-described object and other objects of the present invention, and features and advantages of the present invention will be made further clear by the preferred embodiment described below and the following drawings attached thereto.

DESCRIPTION OF EMBODIMENTS

Hereinbelow, an exemplary embodiment according to the present invention will be described. Note that the exemplary embodiment described below is merely an example, and the present invention is not limited to the configuration of the exemplary embodiment described below.

An index scan device according to this exemplary embodiment includes: an index storage unit that stores each index data for identifying each of plural partial spaces, into which a multi-dimensional space mapped in a database is divided, in a manner such that each index data is associated with each page-identifying data for identifying a data page storing data belonging to each of the plural partial spaces; a search-space acquiring unit that acquires information on a search space in the multi-dimensional space corresponding to a search range of a query, or information on a partial search space in this search space; a search-point setting unit that sets, as a search point, a data point corresponding to at least one of a minimum and a maximum of values obtained by changing each data point in the multi-dimensional space to be one-dimensional, from among data points contained in the search space or the partial search space; an index searching unit that identifies, in the index storage unit, index data associated with a partial space containing the search point set by the search-point setting unit, and extracts page-identifying data associated with the identified index data, as page-identifying data corresponding to a partial space overlapping with at least part of the search space; and a search-area determining unit that estimates a boundary line passing through the search space or the partial search space and dividing the multi-dimensional space into the plural partial spaces, on the basis of identification information on the partial space obtained from the index data identified by the index searching unit, and determines, from among divided search spaces obtained by dividing the search space or the partial search space by the estimated boundary line, a divided search space excluding the partial space containing this search point as the partial search space.

An index scan method according to this exemplary embodiment scans an index storage unit that stores each index data for identifying each of plural partial spaces, into which a multi-dimensional space mapped in a database is divided, in a manner such that each index data is associated with each page-identifying data for identifying a data page storing data belonging to each of the partial spaces. This index scan method includes: acquiring information on a search space in the multi-dimensional space corresponding to a search range of a query, or information on a partial search space in this search space; setting, as a search point, a data point corresponding to at least one of a minimum and a maximum of values obtained by changing each data point in the multi-dimensional space to be one-dimensional, from among data points contained in the search space or the partial search space; identifying, in the index storage unit, index data associated with a partial space containing the search point; extracting page-identifying data associated with the identified index data, as page-identifying data corresponding to a partial space overlapping with at least part of the search space; estimating a boundary line passing through the search space or the partial search space and dividing the multi-dimensional space into the plural partial spaces, on the basis of identification information on the partial space obtained from the identified index data; and determining, from among divided search spaces obtained by dividing the search space or the partial search space by the estimated boundary line, a divided search space excluding the partial space containing the search point as the partial search space.

In this exemplary embodiment, at least one of a data point corresponding to the maximum value of values that have been made one-dimensional (hereinafter, referred to as a maximum data point) and a data point corresponding to the minimum value of the values that have been made one-dimensional (hereinafter, referred to as a minimum data point) is set to be the search point from among data points contained in the search space or the partial search space; index data associated with a partial space containing this search point is identified; and page-identifying data associated with this identified index data is extracted. The extracted page-identifying data is one for identifying a data page that stores data belonging to a partial space overlapping with at least part of this search space.

Further, in this exemplary embodiment, a boundary line passing through the search space or the partial search space is estimated on the basis of identification information on the partial space obtained from the index data as identified above, and it is determined that, from among divided search spaces obtained by dividing the search space or the partial search space by the estimated boundary line, a divided search space excluding the partial space containing this search point is the partial search space. With these processes, for the partial search space determined above, the search point is set, the index data is identified, and the page-identifying data is extracted, as described above. These processes are repeated, for example, until all the page-identifying data for the partial spaces that overlap with at least part of the search space are extracted.

As described above, in this exemplary embodiment, once one partial space that overlaps with the search space is found, how the entire multi-dimensional space is spatially divided (boundary line) is estimated as much as possible on the basis of the existence of this partial space; the search space excluding the one partial space found is divided into a group of smaller search spaces by the estimated boundary line; and the scanning range for the index data is replaced with the smaller search spaces.

As a result, according to this exemplary embodiment, the index scan is performed only for the partial space that overlaps with at least part of the search space corresponding to the search range of the query, and hence, it is possible to increase the speed of index scan.

[First Exemplary Embodiment]

Below, the exemplary embodiment described above will be described in more detail.

[Device Configuration]

Figure 1:
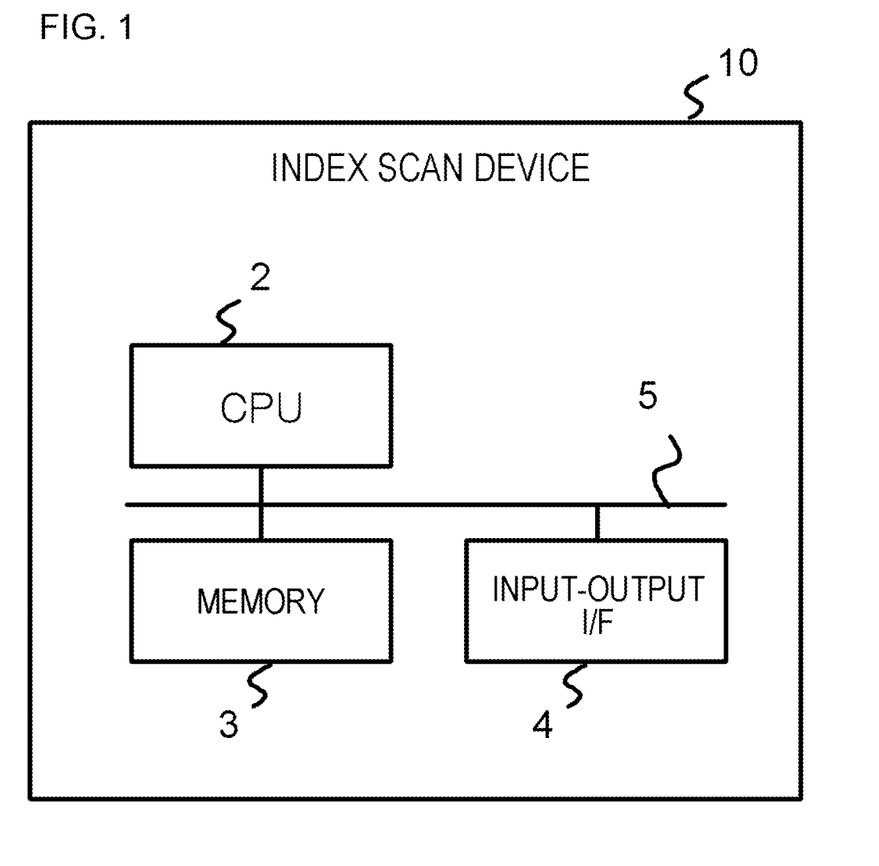
FIG. 1 is a diagram schematically illustrating an example of a hardware configuration of an index scan device according to the first exemplary embodiment.

FIG. 1 is a diagram schematically illustrating an example of a hardware configuration of an index scan device 10 according to the first exemplary embodiment. The index scan device 10 according to the first exemplary embodiment is a so-called computer, and includes, for example, a central processing unit (CPU) 2, a memory 3, and an input-output interface (I/F) 4, which are connected to each other, for example, through a bus 5. The memory 3 includes, for example, a random access memory (RAM), a read only memory (ROM), a hard disk, and a portable storage medium.

The input-output I/F 4 is connected, for example, to a communication device that communicates with other computers through a network (not illustrated). The input-output I/F 4 may be connected to a keyboard, a mouse or other input device that receives user operations, and/or a display device, a printer or other output device that provides users with information. The hardware configuration of the index scan device 10 is not limited.

Figure 2:
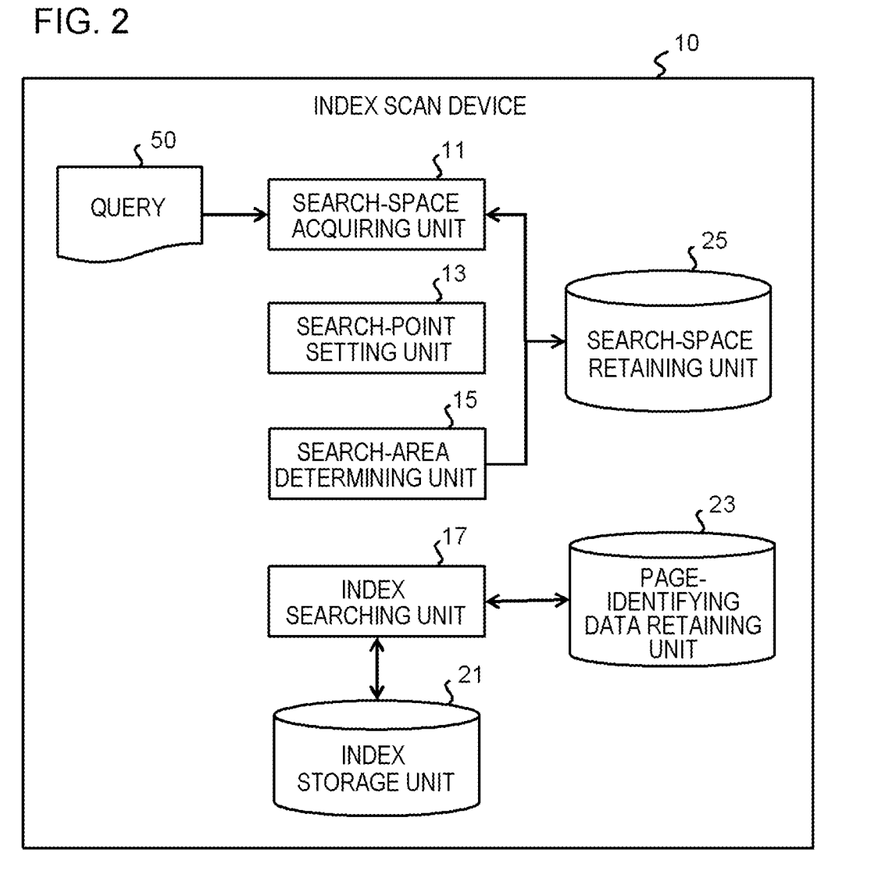
FIG. 2 is a diagram schematically illustrating an example of a process configuration of the index scan device according to the first exemplary embodiment.

FIG. 2 is a diagram schematically illustrating an example of a process configuration of the index scan device 10 according to the first exemplary embodiment. The index scan device 10 according to the first exemplary embodiment includes, for example, a search-space acquiring unit 11, a search-point setting unit 13, a search-area determining unit 15, an index searching unit 17, an index storage unit 21, a page-identifying data retaining unit 23, and a search-space retaining unit 25. These processing units are realized, for example, with a CPU 2 running a program stored in the memory 3. Such a program may be installed, for example, from a compact disk (CD), a memory card or other portable storage medium, or be installed from another computer on the network through the input-output I/F 4, and then, be stored in the memory 3.

The index scan device 10 is applied to a database system including an index storage unit 21 and a data storage unit (not illustrated). The data storage unit stores plural data with plural data pages. Each of the data pages stores data, the number of which is not more than a predetermined threshold value.

The index storage unit 21 stores plural entries each including the index data for identifying each of the partial spaces constituting the multi-dimensional space into which plural data stored in the data storage unit are mapped, and the page-identifying data for identifying each of the data pages corresponding to each of the partial spaces. With each of the entries stored in the index storage unit 21, one index data indicating one partial space, and one page-identifying data for identifying a data page corresponding to this partial space are identified. Note that it may be possible that one index data indicates plural partial spaces, and is included in one entry together with plural page-identifying data.

Each of the index data has a data format that allows to identify the position of and the range of each of the partial spaces. For example, in the case where each of the data points in the multi-dimensional space that has been changed to be one-dimensional is expressed in binary form, each of the index data is set to the longest common prefix of the data points contained in the corresponding partial space. The method of dividing the multi-dimensional space into plural partial spaces includes, for example, a space-partitioning method such as KD (K-Dimensional)-Tree. To change the multi-dimensional space to be one-dimensional, for example, a space-filling curve such as a Z-order curve and a Hilbert curve is used.

The search-space acquiring unit 11 acquires a query 50 for multi-dimensional range search, and analyzes this query 50 to acquire information on a search space in the multi-dimensional space corresponding to a search range of the query 50. The information on the search space contains at least the minimum data point and the maximum data point of the data points included in this search space. After acquiring this information on the search space, the search-space acquiring unit 11 acquires information on a partial search space retained in the search-space retaining unit 25. The partial search space represents a space in the search space, and means a not-yet-processed space from which no page-identifying data corresponding to this space has been extracted by the index searching unit 17, which will be described later. The partial search space overlaps with at least one partial space.

The search-point setting unit 13 sets, from among the data points contained in the search space, at least one of the minimum data point and the maximum data point as the search point. In this case, only the minimum data point, only the maximum data point, or both of the minimum data point and the maximum data point are set as the search point. Further, in the case where the search-space acquiring unit 11 acquires the partial search space, the search-point setting unit 13 sets, from among the data points contained in the partial search space, at least one of the minimum data point and the maximum data point to be the search point.

The index searching unit 17 searches the index storage unit 21 to identify an entry containing index data for a partial space containing the search point set by the search-point setting unit 13, and extracts page-identifying data contained in this identified entry. The page-identifying data thus extracted corresponds to a partial space overlapping with at least part of the search space. The extracted page-identifying data is retained by the page-identifying data retaining unit 23.

The search-area determining unit 15 determines, on the basis of identification information on the partial space (for example, a position or range) obtained from the index data contained in the entry identified by the index searching unit 17, that the partial search space is a space remaining after excluding, from the search space or the partial search space, the partial space corresponding to the page-identifying data that has already been extracted. Hereinafter, this remaining space is also referred to as an untracked search space. At this time, the search-area determining unit 15 estimates a boundary line passing through the search space or the partial search space and dividing the multi-dimensional space into plural partial spaces, and determines that each space obtained by dividing the above-described untracked search space by this boundary line is the partial search space. The information on the partial search space as determined above is retained in the search-space retaining unit 25.

The page-identifying data retaining unit 23 retains the page-identifying data extracted by the index searching unit 17. This means that the page-identifying data retaining unit 23 retains the page-identifying data corresponding to the partial space overlapping with at least part of the search space. The page-identifying data is, for example, an address of the data page.

The search-space retaining unit 25 retains information on the partial search space determined by the search-area determining unit 15. The information on the partial search space includes at least the minimum data point or the maximum data point of the data points contained in this partial search space.

[Example of Operation]

Figure 3:
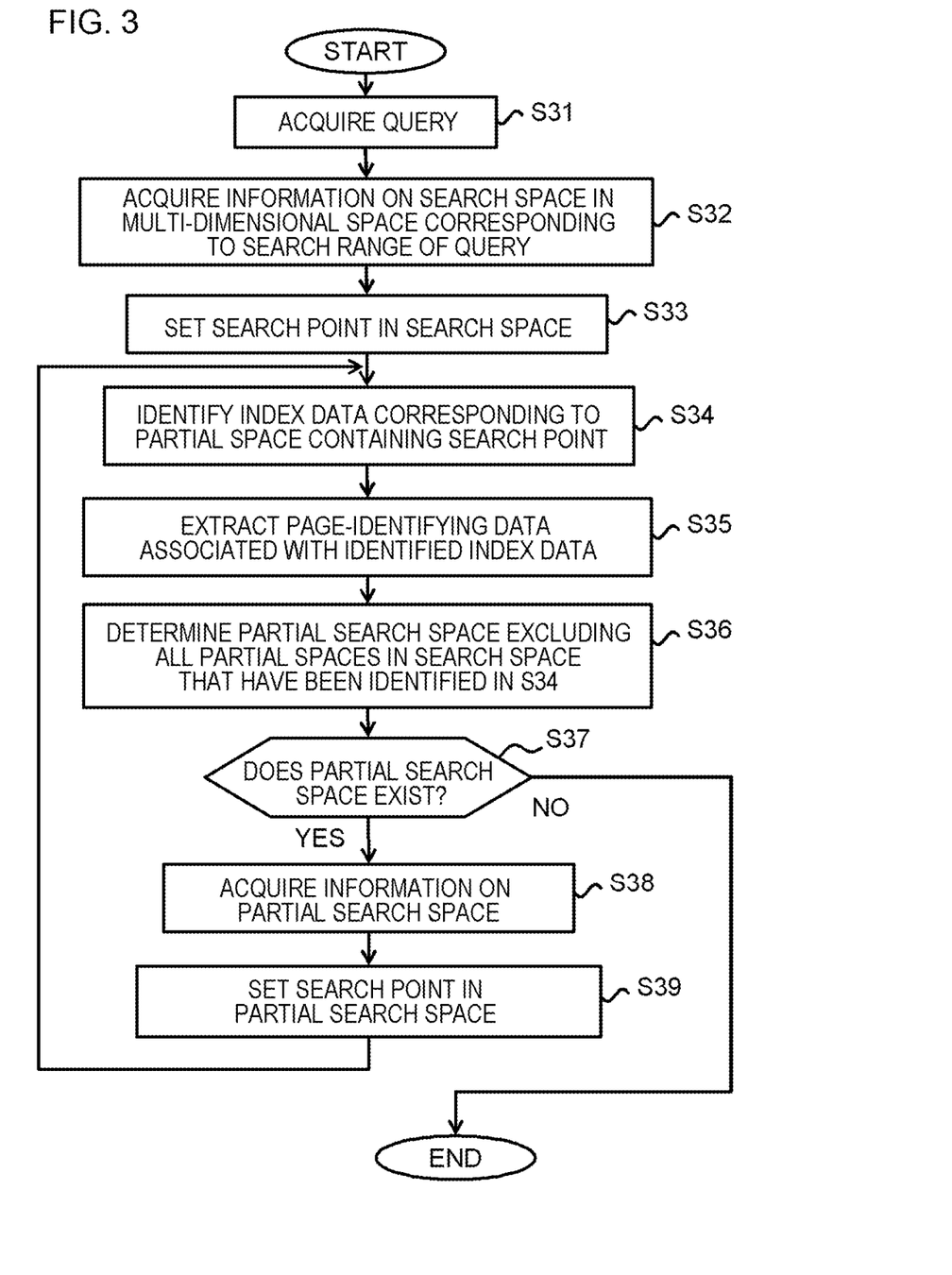
FIG. 3 is a flowchart showing an example of operations performed by the index scan device according to the first exemplary embodiment.

Next, the index scan method according to the first exemplary embodiment will be described with reference to FIG. 3. FIG. 3 is a flowchart showing an example of operations performed by the index scan device 10 according to the first exemplary embodiment.

The index scan device 10 acquires the query 50 for multi-dimensional range search (S31). The index scan device 10 acquires information on the search space in the multi-dimensional space corresponding to the search range of this query 50 (S32).

Then, the index scan device 10 sets a search point in this search space (S33). For example, the index scan device 10 sets at least one of the minimum data point and the maximum data point of the data points contained in the search space, as the search point.

The index scan device 10 identifies index data corresponding to a partial space containing this search point from among the index data stored in the index storage unit 21 (S34). In other words, the index scan device 10 scans the index data stored in the index storage unit 21 to identify the partial space containing this search point from among plural partial spaces constituting the multi-dimensional space.

The index scan device 10 extracts page-identifying data associated with the identified index data (S35). The index scan device 10 causes the page-identifying data retaining unit 23 to retain the extracted page-identifying data.

Then, the index scan device 10 determines that the remaining space (untracked search space) excluding all the partial spaces in the search space that have been identified in S34 is the partial search space (S36). At this time, the index scan device 10 estimates a boundary line passing through the search space on the basis identification information on the partial space identified in S34, and determines each space obtained by dividing the untracked search space by this boundary line to be the partial search space. With these processes, if one or more boundary lines passing through the search space are found, one or more partial search spaces are determined. The index scan device 10 causes the search-space retaining unit 25 to retain the information on the partial search space as determined above.

The index scan device 10 judges whether a partial search space exists (S37). More specifically, the index scan device 10 makes this judgment by judging whether the search-space retaining unit 25 retains information on a partial search space. If it is judged that a partial search space does not exist (S37; NO), the index scan device 10 judges that all the page-identifying data associated with the partial space overlapping with at least part of this search space are extracted, and ends the processes.

On the other hand, if it is judged that a partial search space exists (S37; YES), the index scan device 10 acquires the information on one partial search space from the search-space retaining unit 25 (S38). The information on the partial search space acquired by the index scan device 10 is deleted from the search-space retaining unit 25.

The index scan device 10 sets a search point in this partial search space (S39). This search point is, for example, at least one of the minimum data point and the maximum data point of the data points contained in this partial search space.

The index scan device 10 performs the processes S34, S35, and S36 as described above to the newly set search point. At this time, if a partial search space is newly determined in S36, information on this new partial search space is added to the search-space retaining unit 25. If it is judged in S36 that no new partial search space exists, information on the partial search space retained in the search-space retaining unit 25 is acquired (S37). The index scan device 10 performs the processes S38, S39, S34, S35, and S36 until information on the partial search space retained in the search-space retaining unit 25 no longer exists (S37; NO).

It should be noted that, in the example of operations described above, the partial search space is processed one by one. However, in the case where plural partial search spaces are retained in the search-space retaining unit 25, it may be possible to perform the processes from S34 to S39 in parallel and separately for each of the partial search spaces. This is realized, for example, with a configuration in which a set of the search-space acquiring unit 11, the search-point setting unit 13, the search-area determining unit 15 and the index searching unit 17 is operated in parallel for each of the partial search spaces.

[Operation and Effect of First Exemplary Embodiment]

As described above, in the first exemplary embodiment, in the index storage unit 21, when the index data corresponding to the partial space overlapping with the search space are searched for, index data corresponding to the partial space containing the data point corresponding to at least one of the minimum and the maximum of binary numbers obtained by converting each of the data points in the multi-dimensional space into one dimension are identified. Then, on the basis of identification information (position and range) on the corresponding partial space obtained from the identified index data, how the entire multi-dimensional space is spatially divided is estimated. With this estimation, information on the boundary line passing through the search space is acquired, and information on the partial search space obtained by dividing, by the boundary line, the remaining space (untracked search space) excluding the identified partial space in the search space is obtained. After this, the partial space overlapping with the partial search space thus obtained is detected.

Thus, according to the first exemplary embodiment, index scan is performed only to the partial space overlapping with at least part of the search space corresponding to the search range of the query 50, and hence, it is possible to increase the speed of the index scan.

Example

Below, an example of the exemplary embodiment will be described more specifically. In the following Example, an example is given in which the search target space having the database mapped thereinto is two-dimensional; this two-dimensional space is converted into one-dimension through the Z-order curve (space-filling curve); each of the data points is expressed in binary form; and this two-dimensional space is spatially divided through KD-Tree.

Figure 4:
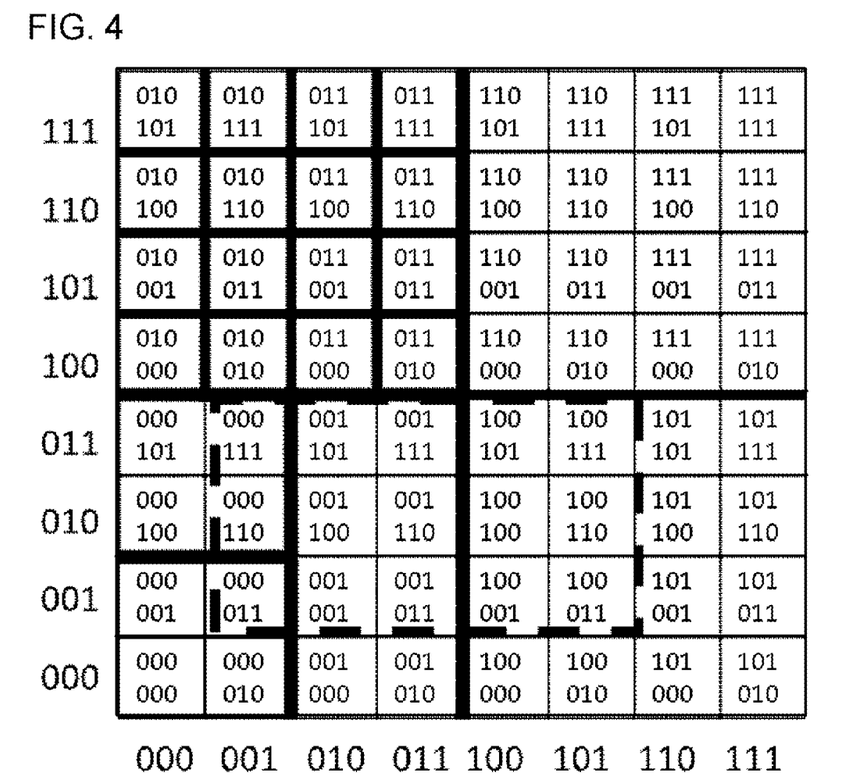
FIG. 4 is a diagram schematically illustrating a two-dimensional space and a two-dimensional search range mapped in a database in Example.

FIG. 4 is a diagram schematically illustrating a two-dimensional space and a two-dimensional search range mapped in a database in Example. Note that, hereinbelow, the horizontal axis in FIG. 4 is referred to as X axis and the vertical axis is referred to as Y axis. The thick line in FIG. 4 indicates the boundary line of the spatial division, and the thick dotted line in FIG. 4 indicates the search space. Each of the data points in the two-dimensional space is identified with binary numbers illustrated in FIG. 4 (the upper line shows the high-order three digits and the lower line shows the low-order three digits). Each of the binary numbers is formed in a manner so that values (binary numbers with three digits) of each of the data points on the respective axes are alternately arranged one digit by one digit in the direction from the high-order digit to the low-order digit. More specifically, the data point identified by the number "001" on X axis and the number "010" on Y axis is formed by arranging values in order of the highest-order digit "0" on X axis, the highest-order digit "0" on Y axis, the second highest-order digit "0" on X axis, the second highest-order digit "1" on Y axis, the last digit "1" on X axis, and the last digit "0" on Y axis ("000110").

Figure 5:
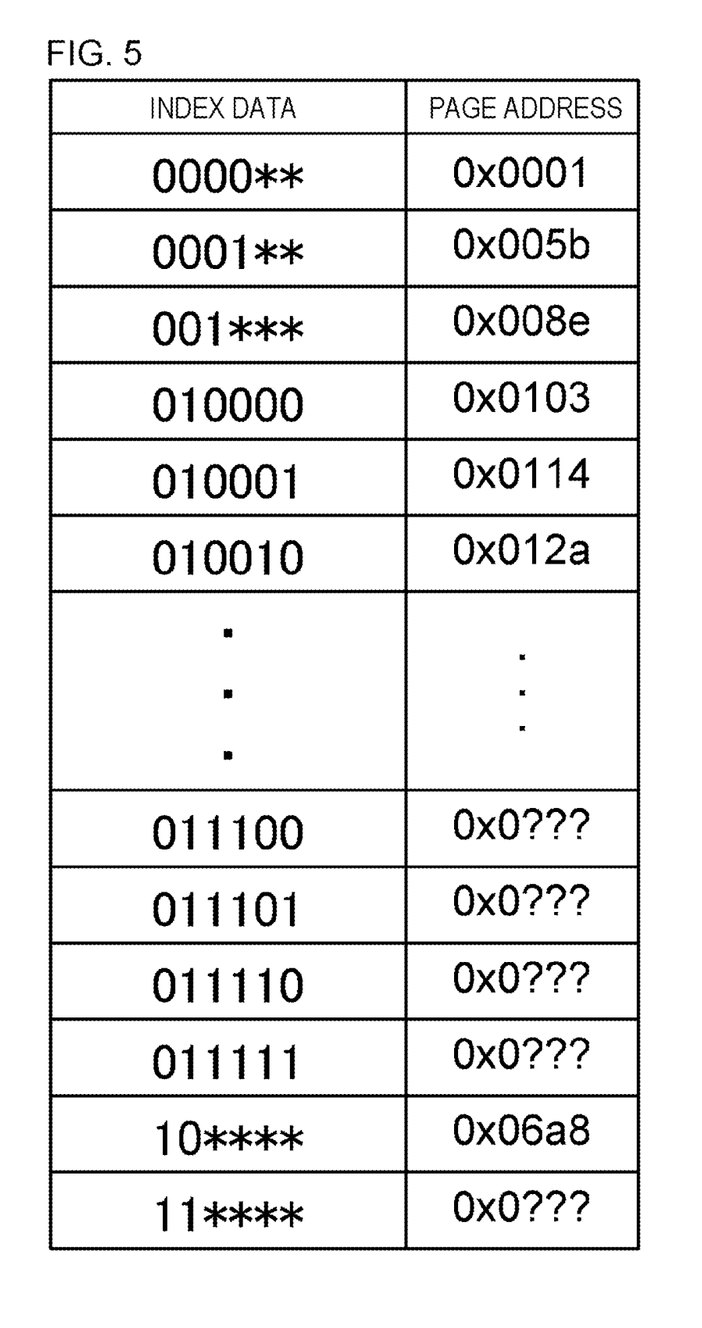
FIG. 5 is a diagram illustrating an example of an entry stored in an index storage unit in Example.

FIG. 5 is a diagram illustrating an example of an entry stored in the index storage unit 21 in Example. In the example illustrated in FIG. 5, each entry includes index data for identifying one of partial spaces illustrated in FIG. 4, and a page address corresponding to the index data. Each of the index data is expressed with the longest common prefix of the binary numbers contained in the corresponding partial space, "*" representing the other digit. The "*" means that the value of this digit is not limited.

For example, the index data of the partial space containing the data points "000000," "000001," "000010," and "000011" (lower left in FIG. 4) is formed by the longest common prefix "0000" and "" representing the other two digits. Further, the index data of the partial space containing the data points "001000," "001001," "001010," "001011," "001100," "001101," "001110," and "001111" (the space to the right of the above-described partial space in FIG. 4) is formed by the longest common prefix "001" and "*" representing the other three digits. In Example, the entries in the index storage unit 21 are arranged by sorting the index data in ascending order.

Below, an example of operations performed by the index scan device 10 in this Example will be described with reference to FIG. 3. Note that explanation of the details same as those described in the first exemplary embodiment will not be repeated.

The index scan device 10 acquires information on the search-point in the two-dimensional space corresponding to the search range of the query 50 acquired in S31 (S32). In Example, the information on this search space contains the maximum data point "100111" and the minimum data point "000011."

The index scan device 10 sets the search point in this search space (S33). Here, it is assumed that the index scan device 10 sets, as the search point, the minimum data point "000011" of the data points contained in the search space.

The index scan device 10 identifies index data corresponding to the partial space containing this search point "000011" from among the index data shown in FIG. 5 (S34). In this Example, in the index storage unit 21, by applying binary search for entries having the index data matching in prefix with the search point, it is possible to efficiently find the index data to be identified. Here, the index data "0000**" is identified as the index data matching in prefix with the search point "000011."

Figure 6:
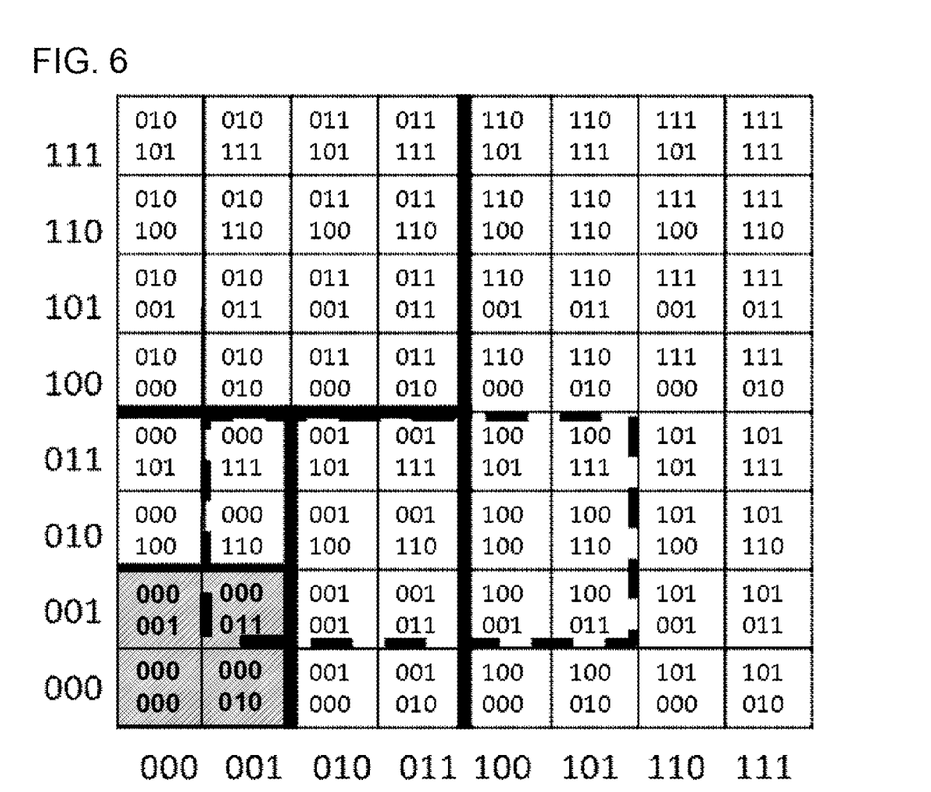
FIG. 6 is a diagram schematically illustrating a partial space (including a minimum data point) that has been first identified and a boundary line estimated on the basis of this partial space.

FIG. 6 is a diagram schematically illustrating a partial space that has been first identified and a boundary line estimated on the basis of this partial space. The area shaded in FIG. 6 is the partial space identified by the index data "0000." The index scan device 10 extracts the page-identifying data "0x0001" associated with the identified index data "0000" (S35). The index scan device 10 causes the page-identifying data retaining unit 23 to retain the extracted page-identifying data "0x0001."

Then, the index scan device 10 determines the remaining space (untracked search space), in the search space, excluding the partial space (index data "0000") as identified above to be the partial search space (S36**).

Here, if it is found that the partial space shaded in FIG. 6 exists, it is possible to estimate that the entire two-dimensional space is spatially divided by the boundary line illustrated with the thick line in FIG. 6. This is based on the characteristics of the space-partitioning method using KD-Tree on a spatial basis used in this Example. In general, with the space-partitioning method on the spatial basis, the multi-dimensional space is regularly and recursively divided, and hence, it is possible to calculate backward how the space is divided to obtain a certain partial space on the basis of the position and the range of the certain partial space. On the other hand, with the space-partitioning method on a data point basis, the space-dividing boundary is determined on the basis of the data points, and hence, in general, it is not possible to obtain how the space is divided on the basis of the position and the range through backward calculation.

In the exemplary embodiments described above, on the basis of the facts as described above, each space obtained by dividing the remaining space (untracked search space) excluding the partial space that has already been identified is determined as the partial search space. More specifically, on the basis of information on the spatial division (boundary line information) derived from the identification information (position and range) on the partial space that has already been identified, the untracked search space in the search space is divided. The boundary line passing through the search space is estimated for each of the axes. More specifically, from among the data points on each of the axes, this boundary line is estimated to be located between a data point (hereinafter, referred to as a negative-side boundary value)

indicated by a value obtained by setting 1 for all the digits from the last digit until a digit having a value of 0 first appears in a direction toward the higher digit, and a data point (hereinafter, referred to as a positive-side boundary value) indicated by a value obtained by adding 1 to the above-described value, from among the data points on each of the axes.

Below, on the basis of the example illustrated in FIG. 6, the method of estimating the boundary line will be described more specifically.

First, the lower limit value and the upper limit value of each dimension (each axis) in the untracked search space are acquired. For X axis, the upper limit value is "101" and the lower limit value is "001," and for Y axis, the upper limit value is "011" and the lower limit value is "001."

Then, the suffix strings of the value obtained by subjecting the lower limit value on each dimension to NOT operation are acquired. For X axis, the value obtained by subjecting the lower limit value "001" to NOT operation is "110," and the suffix strings obtained from this value are "0," "10," and "110." Similarly, for Y axis, the suffix strings "0," "10," and "110" are acquired.

The values obtained by adding the lower limit value and "1" to each of the acquired suffix strings are acquired as the candidates for boundary value. Each of the candidates for boundary line on X axis and Y axis can be obtained as follows:

Suffix string "0" on X axis=>candidate for boundary value "010"
Suffix string "10" on X axis=>candidate for boundary value "100"
Suffix string "110" on X axis=>candidate for boundary value "1000"
Suffix string "0" on Y axis=>candidate for boundary value "010"
Suffix string "10" on Y axis=>candidate for boundary value "100"
Suffix string "110" on Y axis=>candidate for boundary value "1000"

Of the candidates for boundary value thus acquired, the candidate for boundary value included in the ranges of the lower limit values and the upper limit values of these axes in the untracked search space is estimated to be a value (positive-side boundary value) located on the positive side (right side of X axis and upper side of Y axis) of the boundary line of this dimension. Note that the value obtained by subtracting 1 from the boundary value described above is a value (negative-side boundary value) located on the negative side (left side of X axis and lower side of Y axis) of the boundary line of this dimension.

Positive-side boundary value on X axis="010," "100"
Negative-side boundary value on X axis="001," "011"
Positive-side boundary value on Y axis="010"
Negative-side boundary value on Y axis="001"

Here, the data point indicated by the positive-side boundary value on X axis and the lower limit value on Y axis in the search space, and the data point indicated by the positive-side boundary value on Y axis and the lower limit value on X axis in the search space are the minimum data points in this partial search space.

First minimum data point ("010", "001")="001001"
Second minimum data point ("100", "001")="100001"
Third minimum data point ("001", "010")="000110"

With these processes, the index scan device 10 can determine that the remaining space excluding the shaded partial space that has already been identified is divided into at least three spaces. These three remaining spaces are added to the search-space retaining unit 25 as the partial search spaces. The information on the partial search spaces may contain the minimum data point as identified above. With this process, the minimum data point may be set to the search point in these partial search spaces.

Further, it may be possible to acquire the maximum data point in each of the partial search spaces on the basis of the data point indicated by the negative-side boundary value on X axis and the upper limit value on Y axis in the search space and the maximum data point in the search spaces.

First maximum data point ("001", "011")="000111"
Second maximum data point ("011", "011")="001111"
Third maximum data point ("101", "011")="100111"

By setting the partial search space as determined above to the subsequent search range, the original search space corresponding to the search range corresponding to the query 50 is narrowed down to a narrower range search. In other words, in the index storage unit 21, the index data "001*" is identified as the index data matching in prefix with the search point (the first minimum data point) "001001." Further, the index data "10" is identified as the index data matching in prefix with the search point (the second minimum data point) "100001." Further, the index data "0001" is identified as the index data matching in prefix with the search point (the third minimum data point) "000110." Note that, in this Example, there is no partial search space newly estimated with each of the partial spaces as identified above.

As described above, according to this Example, by accessing only the entries containing the index data "0000," "001*," "10**," and "0001" of the entries of index data illustrated in FIG. 6, it is possible to obtain a group of target data pages corresponding to the search range of the query 50.

In the example described above, the first search point is set to the minimum data point "000011" of the data points contained in the search space. However, the first search point may be set to the maximum data point "100111." In this case, the index scan is performed in the following manner.

In S34, the index data "10****" is identified as the index data matching in prefix with the search point "100111."

Figure 7:
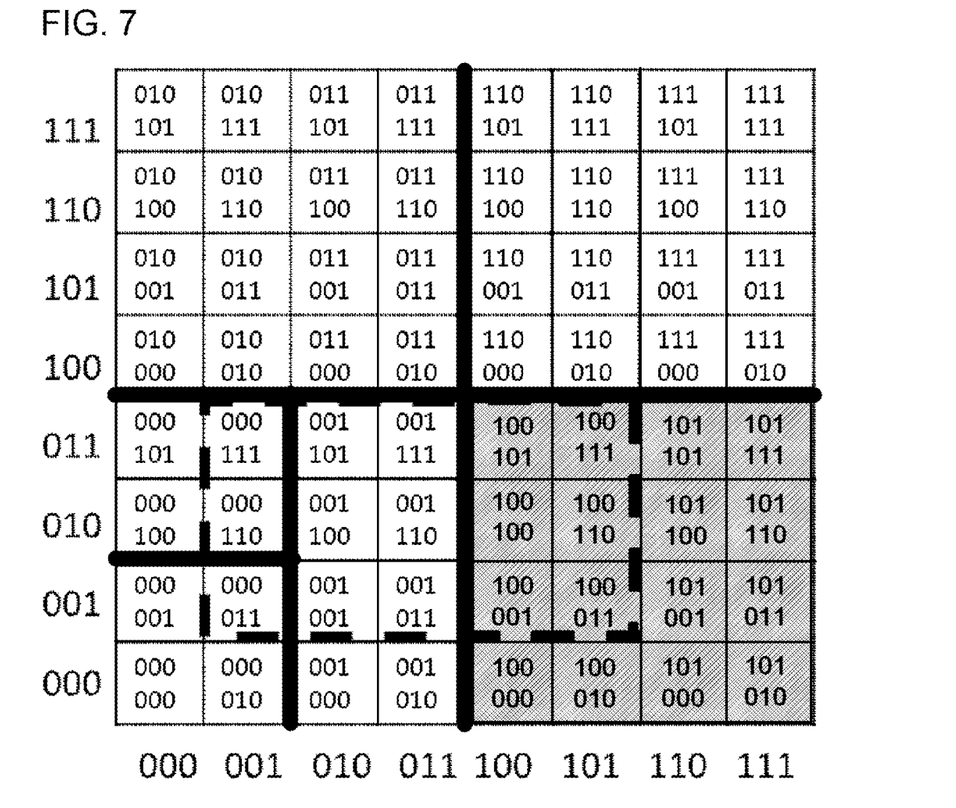
FIG. 7 is a diagram schematically illustrating a partial space (including a maximum data point) that has been first identified and a boundary line estimated on the basis of this partial space.

FIG. 7 is a diagram schematically illustrating a partial space that has been first identified and a boundary line estimated on the basis of this partial space. The shaded area illustrated in FIG. 7 is the partial space identified with the index data "10**." The index scan device 10 extracts page-identifying data "0x06a8" associated with the identified index data "10" (S35). The index scan device 10 causes the page-identifying data retaining unit 23** to retain the extracted page-identifying data "0x06a8."

The index scan device 10 determines that the remaining space (untracked search space) excluding the partial space (index data "10**") in the search space as identified above is the partial search space (S36**), and estimates the boundary line on the basis of the identified partial space in the following manner. At this time, the upper limit value and the lower limit value on each of the axes in the untracked search space are acquired. Here, for X axis, the lower limit value "001" and the upper limit value "011" are acquired, and for Y axis, the lower limit value "001" and the upper limit value "011" are acquired.

Next, suffix strings for values obtained by subjecting the upper limit value of each of the dimensions to NOT operation are acquired. For X axis, the value obtained by subjecting the upper limit value "011" to NOT operation is "100," and the suffix strings obtained from this value are "0" and "100." Similarly, for Y axis, the suffix strings "0" and "100" are acquired.

Here, of the suffix strings thus acquired, the suffix strings of the upper limit value or more on each of the axes in the untracked search space are excluded. In the above-described case, the suffix string "100" on X axis and the suffix string "100" on Y axis are excluded. Then, values obtained by subtracting each of the suffix strings and "1" from the upper limit value on each of the axes are acquired as candidates for boundary value. Each of the candidates for boundary value on X axis and Y axis is acquired as follows:

Suffix string "0" on X axis=>candidate for boundary value "010"

Suffix string "0" on Y axis=>candidate for boundary value "010"

Of the candidates for boundary value thus acquired, the candidate for boundary value included in the ranges of the lower limit value and the upper limit value on each of the axes in the untracked search space is estimated to be a value (positive-side boundary value) located on the positive side (right side of X axis and upper side of Y axis) of the boundary line of this dimension. Note that a value obtained by subtracting 1 from the above-described boundary value is the value (negative-side boundary value) located on the negative-side (left side of X axis and lower side of Y axis) of the boundary line of this dimension.

Positive-side boundary value on X axis="010"
Negative-side boundary value on X axis="001"
Positive-side boundary value on Y axis="010"
Negative-side boundary value on Y axis="001"

Here, the data point indicated by the positive-side boundary value on X axis and the lower limit value on Y axis in the search space, the data point indicated by the positive-side boundary value on Y axis and the lower limit value on X axis in the search space, and the minimum data point in the search space are the minimum data points in this partial search space.

First minimum data point ("010", "001")="001001"
Second minimum data point ("001", "010")="000110"
Third minimum data point (minimum data point in the search space)="000011"

[Comparative Example]

Below, an index scan method different from this exemplary embodiment will be described as Comparative Example in order to show the effects obtained from each of the exemplary embodiments and Example described above. The following description will be made using the two-dimensional space and the two-dimensional range search illustrated in FIG. 4 and FIG. 5, and the index storage unit 21.

The method according to Comparative Example scans all the entries contained in the index storage unit 21 and ranging from an entry containing index data corresponding to the maximum data point in the search space to an entry containing index data corresponding to the minimum data point. In other words, of the entries illustrated in FIG. 5, all the entries ranging from the entry containing the index data "0000" to the entry containing the index data "10**" are checked as to whether the corresponding partial space and the search space overlap with each other.

However, as described above, the partial spaces to be identified are only four partial spaces: index data "0000," "001*," "10**," and "0001." Thus, with the method according to Comparative Example, the partial spaces corresponding to the index data "010000" to the index data "011111" are checked for overlap. However, they do not overlap with the search space, and hence, are not identified.

This means that, with the method according to Comparative Example, although the search target range is narrower than the entire space, there is a possibility that the number of partial spaces subjected to index scan is approximately the same as the number of partial spaces corresponding to all the indices stored in the index storage unit 21. As a result, with Comparative Example, it takes a long time to scan the indices.

On the other hand, according to the exemplary embodiments and Example described above, index scan is performed only to the partial spaces that overlap with at least part of the search spaces corresponding to the search range in the query, and thus, the speed of index scan is increased. The difference between the effects obtained from the exemplary embodiments or Example described above and those from Comparative Example becomes distinct in the case where the number of dimensions to be searched is large or in the case where there is a difference between the widths of the dimension ranges each set for searching.

It should be noted that, in the plural flowcharts used in the descriptions above, plural steps (processes) are described in a sequential order. However, the order of the process steps performed in this exemplary embodiment is not limited to the order of the steps described. In this exemplary embodiment, the order of the process steps illustrated in the drawings may be exchanged, provided that the exchange does not impair the details of the processes. Further, the above-described exemplary embodiments and the modification example may be combined, provided that the details thereof do not contradict each other.

Part or all of the exemplary embodiments and the modification example described above can be described in a manner illustrated in the Supplementary Notes below. However, the exemplary embodiments and the modification example are not limited to the descriptions below.

(Supplemental Note 1)

An index scan device including:

an index storage unit that stores each index data for identifying each of plural partial spaces, into which a multi-dimensional space mapped in a database is divided, in a manner such that each index data is associated with each page-identifying data for identifying a data page storing data belonging to each of the plural partial spaces;

a search-space acquiring unit that acquires information on a search space in the multi-dimensional space corresponding to a search range of a query, or information on a partial search space in this search space;

a search-point setting unit that sets, as a search point, a data point corresponding to at least one of a minimum and a maximum of values obtained by changing each data point in the multi-dimensional space to be one-dimensional, from among data points contained in the search space or the partial search space;

an index searching unit that identifies, in the index storage unit, index data associated with a partial space containing the search point set by the search-point setting unit, and extracts page-identifying data associated with the identified index data, as page-identifying data corresponding to a partial space overlapping with at least part of the search space; and a search-area determining unit that estimates a boundary line passing through the search space or the partial search space and dividing the multi-dimensional space into the plural partial spaces, on the basis of identification information on the partial space obtained from the index data identified by the index searching unit, and determines, from among divided search spaces obtained by dividing the search space or the partial search space by the estimated boundary line, a divided search space excluding the partial space containing the search point as the partial search space.
(Supplemental Note 2)
The index scan device according to Supplemental Note 1, in which each of the index data has a data format allowing to identify a position of and a range of each of the partial spaces.
(Supplemental Note 3)
The index scan device according to Supplemental Note 1 or 2, in which
the multi-dimensional space is spatially divided using K-Dimensional (KD)-Tree;
the multi-dimensional space is changed to be one-dimensional using a space-filling curve;
a value obtained by changing each data point in the multi-dimensional space to be one-dimensional is expressed in binary form;
the index storage unit sets, as the index data, a longest common prefix of the data points contained in each of the partial spaces; and
the search-area determining unit estimates the boundary line to be located between a data point indicated by a value obtained by setting 1 for all digits from a last digit until a digit having 0 first appears in a direction toward the higher digit, and a data point indicated by a value obtained by adding 1 to said value, from among data points on each axis.
(Supplemental Note 4)
An index scan method that scans an index storage unit that stores each index data for identifying each of plural partial spaces, into which a multi-dimensional space mapped in a database is divided, in a manner such that each index data is associated with each page-identifying data for identifying a data page storing data belonging to each of the plural partial spaces, the method including:
acquiring information on a search space in the multi-dimensional space corresponding to a search range of a query, or information on a partial search space in this search space;
setting, as a search point, a data point corresponding to at least one of a minimum and a maximum of values obtained by changing each data point in the multi-dimensional space to be one-dimensional, from among data points contained in the search space or the partial search space;
identifying, in the index storage unit, index data associated with a partial space containing the search point;
extracting page-identifying data associated with the identified index data, as page-identifying data corresponding to a partial space overlapping with at least part of the search space;
estimating a boundary line passing through the search space or the partial search space and dividing the multi-dimensional space into the plural partial spaces, on the basis of identification information on the partial space obtained from the identified index data; and
determining, from among divided search spaces obtained by dividing the search space or the partial search space by the estimated boundary line, a divided search space excluding the partial space containing the search point as the partial search space.
(Supplemental Note 5)
The index scan method according to Supplemental Note 4, in which each of the index data has a data format that allows to identify a position of and a range of each of the partial spaces.
(Supplemental Note 6)
The index scan method according to Supplemental Note 4 or 5, in which the multi-dimensional space is spatially divided using K-Dimensional (KD)-Tree;
the multi-dimensional space is changed to be one-dimensional using a space-filling curve;
a value obtained by changing each data point in the multi-dimensional space to be one-dimensional is expressed in binary form;
the index storage unit sets, as the index data, a longest common prefix of the data points contained in each of the partial spaces; and
the estimation of the boundary line includes estimating the boundary line to be located between a data point indicated by a value obtained by setting 1 for all digits from a last digit until a digit having 0 first appears in a direction toward the higher digit, and a data point indicated by a value obtained by adding 1 to said value, from among data points on each axis.
(Supplemental Note 7)
A program that causes a computer to realize:
an index storage unit that stores each index data for identifying each of plural partial spaces, into which a multi-dimensional space mapped in a database is divided, in a manner such that each index data is associated with each page-identifying data for identifying a data page storing data belonging to each of the plural partial spaces;
a search-space acquiring unit that acquires information on a search space in the multi-dimensional space corresponding to a search range of a query, or information on a partial search space in this search space;
a search-point setting unit that sets, as a search point, a data point corresponding to at least one of a minimum and a maximum of values obtained by changing each data point in the multi-dimensional space to be one-dimensional, from among data points contained in the search space or the partial search space;
an index searching unit that identifies, in the index storage unit, index data associated with a partial space containing the search point set by the search-point setting unit, and extracts page-identifying data associated with the identified index data, as page-identifying data corresponding to a partial space overlapping with at least part of the search space; and
a search-area determining unit that estimates a boundary line passing through the search space or the partial search space and dividing the multi-dimensional space into the plurality of partial spaces, on the basis of identification information on the partial space obtained from the index data identified by the index searching unit, and determines, from among divided search spaces obtained by dividing the search space or the partial search space by the estimated boundary line, a divided search space excluding the partial space containing the search point as the partial search space.
(Supplemental Note 8)
The program according to Supplemental Note 7, in which each of the index data has a data format that allows to identify a position of and a range of each of the partial spaces.
(Supplemental Note 9)
The program according to Supplemental Note 7 or 8, in which
the multi-dimensional space is spatially divided using K-Dimensional (KD)-Tree;
the multi-dimensional space is changed to be one-dimensional using a space-filling curve;
a value obtained by changing each data point in the multi-dimensional space to be one-dimensional is expressed in binary form;

the index storage unit sets, as the index data, a longest common prefix of the data points contained in each of the partial spaces; and the search-area determining unit estimates the boundary line to be located between a data point indicated by a value obtained by setting 1 for all digits from a last digit until a digit having 0 first appears in a direction toward the higher digit, and a data point indicated by a value obtained by adding 1 to said value, from among data points on each axis.

(Supplemental Note 10)

A computer-readable storage medium that stores the program according to any one of Supplemental Note 7 to 9.

The present application claims priority based on Japanese Patent Application No. 2012-005562 filed in Japan on Jan. 13, 2012, the disclosures of which are incorporated herein by reference in their entirety.

The invention claimed is:

1. An index scan device comprising:
a memory storing instructions; and
a processor that, when executing the instructions, is configured to:
store each index data for identifying each of a plurality of partial spaces, into which a multi-dimensional space mapped in a database is divided, in a manner such that each index data is associated with each page-identifying data for identifying a data page storing data belonging to each of the plurality of partial spaces;
acquire information on a search space in the multi-dimensional space corresponding to a search range of a query, or information on a partial search space in this search space;
set, as a search point, a data point corresponding to at least one of a minimum and a maximum of values obtained by changing each data point in the multi-dimensional space to be one-dimensional, from among data points contained in the search space or the partial search space;
identify index data associated with a partial space containing the set search point;
extract page-identifying data associated with the identified index data, as page-identifying data corresponding to a partial space overlapping with at least part of the search space;
estimate a boundary line passing through the search space or the partial search space and dividing the multi-dimensional space into the plurality of partial spaces, on the basis of identification information on the partial space obtained from the identified index data; and
determine, from among divided search spaces obtained by dividing the search space or the partial search space by the estimated boundary line, a divided search space excluding the partial space containing the search point as the partial search space,
wherein the index data of the partial space is a longest common prefix of binary values obtained by changing the data points contained in the partial space into one-dimensional values, and
wherein the boundary line is estimated to be located between a data point indicated by a value obtained by setting 1 for all digits from a last digit until a digit having 0 first appears in a direction toward the higher digit, and a data point indicated by a value obtained by adding 1 to the value, from among data points on each axis.

2. The index scan device according to claim 1, wherein each of the index data has a data format that allows identification of a position of and a range of each of the partial spaces.

3. The index scan device according to claim 1, wherein the multi-dimensional space is spatially divided using a K-Dimensional (KD)-Tree; and
the multi-dimensional space is changed to be one-dimensional using a space-filling curve.

4. An index scan method that scans a storage device that stores each index data for identifying each of a plurality of partial spaces, into which a multi-dimensional space mapped in a database is divided, in a manner such that each index data is associated with each page-identifying data for identifying a data page storing data belonging to each of the plurality of partial spaces, the index scan method including:
acquiring information on a search space in the multi-dimensional space corresponding to a search range of a query, or information on a partial search space in this search space;
setting, as a search point, a data point corresponding to at least one of a minimum and a maximum of values obtained by changing each data point in the multi-dimensional space to be one-dimensional, from among data points contained in the search space or the partial search space;
identifying index data associated with a partial space containing the search point;
extracting page-identifying data associated with the identified index data, as page-identifying data corresponding to a partial space overlapping with at least part of the search space;
estimating a boundary line passing through the search space or the partial search space and dividing the multi-dimensional space into the plurality of partial spaces, on the basis of identification information on the partial space obtained from the identified index data; and
determining, from among divided search spaces obtained by dividing the search space or the partial search space by the estimated boundary line, a divided search space excluding the partial space containing the search point as the partial search space,
wherein the index data of the partial space is a longest common prefix of binary values obtained by changing the data points contained in the partial space into one-dimensional values; and
wherein the boundary line is estimated to be between a data point indicated by a value obtained by setting 1 for all digits from a last digit until a digit having 0 first appears in a direction toward the higher digit, and a data point indicated by the value obtained by adding 1 to said value, from among data points on each axis.

5. The index scan method according to claim 4, wherein each of the index data has a data format that allows identification of a position of and a range of each of the partial spaces.

6. The index scan method according to claim 4, wherein the multi-dimensional space is spatially divided using a K-Dimensional (KD)-Tree; and
the multi-dimensional space is changed to be one-dimensional using a space-filling curve.

7. A non-transitory computer-readable storage medium storing a program that, when executed by a computer, causes the computer to perform a method, the method comprising:
storing each index data for identifying each of a plurality of partial spaces, into which a multi-dimensional space mapped in a database is divided, in a manner such that each index data is associated with each page-identifying data for identifying a data page storing data belonging to each of the plurality of partial spaces;

acquiring information on a search space in the multi-dimensional space corresponding to a search range of a query, or information on a partial search space in this search space;

setting, as a search point, a data point corresponding to at least one of a minimum and a maximum of values obtained by changing each data point in the multi-dimensional space to be one-dimensional, from among data points contained in the search space or the partial search space;

identifying index data associated with a partial space containing the set search point;

extracting page-identifying data associated with the identified index data, as page-identifying data corresponding to a partial space overlapping with at least part of the search space;

estimating a boundary line passing through the search space or the partial search space and dividing the multi-dimensional space into the plurality of partial spaces, on the basis of identification information on the partial space obtained from the identified index data; and determining, from among divided search spaces obtained by dividing the search space or the partial search space by the estimated boundary line, a divided search space excluding the partial space containing the search point as the partial search space, wherein the index data of the partial space is a longest common prefix of binary values obtained by changing the data points contained in the partial space into one-dimensional values; and wherein the boundary line is estimated to be located between a data point indicated by a value obtained by setting 1 for all digits from a last digit until a digit having 0 first appears in a direction toward the higher digit, and a data point indicated by a value obtained by adding 1 to the value, from among data points on each axis.

8. The non-transitory computer-readable storage medium according to claim 7, wherein each of the index data has a data format that allows identification of a position of and a range of each of the partial spaces.

9. The non-transitory computer-readable storage medium according to claim 7, wherein
the multi-dimensional space is spatially divided using a K-Dimensional (KD)-Tree; and
the multi-dimensional space is changed to be one-dimensional using a space-filling curve.

* * * * *